United States Patent [19]
Richard

[11] 4,269,758
[45] May 26, 1981

[54] METHOD FOR HARDENING A COMPOSITION PARTICULARLY INTENDED FOR MAKING FOUNDRY CORES AND MOULDS

[75] Inventor: Gerard Y. Richard, Precy-sur-Oise, France

[73] Assignee: Societe D'Applications de Procedes Industriels et Chimiques S.A.P.I.C., Ansieres, France

[21] Appl. No.: 19,511

[22] Filed: Mar. 12, 1979

[30] Foreign Application Priority Data

Mar. 14, 1978 [FR] France ................................ 78 07331

[51] Int. Cl.[3] ................................ C08L 61/06
[52] U.S. Cl. ................................ 260/38; 260/DIG. 40
[58] Field of Search ................................ 260/38, DIG. 40; 164/16

[56] References Cited

U.S. PATENT DOCUMENTS

| | | | |
|---|---|---|---|
| 3,639,654 | 2/1972 | Robins | 260/DIG. 40 |
| 3,879,339 | 4/1975 | Richard | 260/38 |
| 4,105,725 | 8/1978 | Ross | 164/16 X |
| 4,112,515 | 9/1978 | Sandow | 164/16 X |
| 4,132,260 | 1/1979 | Lüber | 164/16 |

*Primary Examiner*—Lewis T. Jacobs
*Attorney, Agent, or Firm*—Richard L. Johnston

[57] ABSTRACT

The invention has for its object a method for the hardening of a composition particularly intended for making foundry cores and moulds including the known steps of gasifying this composition by $SO_2$ and the introduction into the composition of an agent for oxidizing $SO_2$ characterized in that the $SO_2$ is insufflated diluted with another gas of lower diffusibility.

13 Claims, 3 Drawing Figures

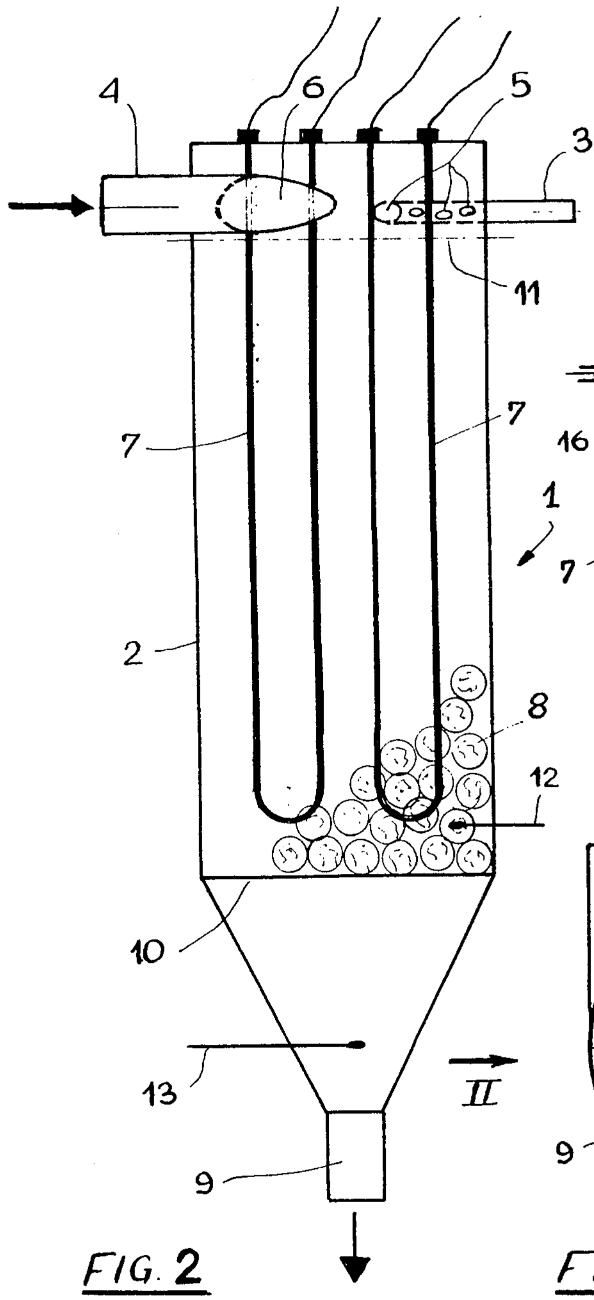
FIG. 2
FIG. 3
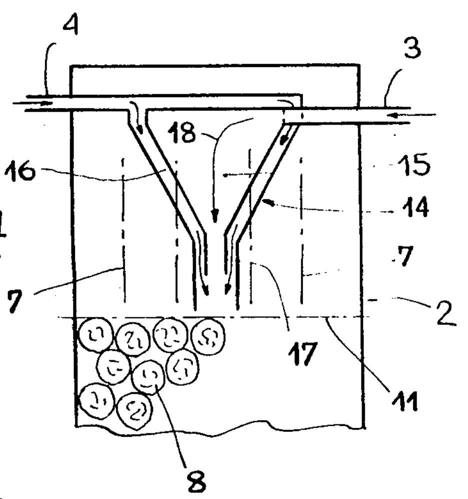
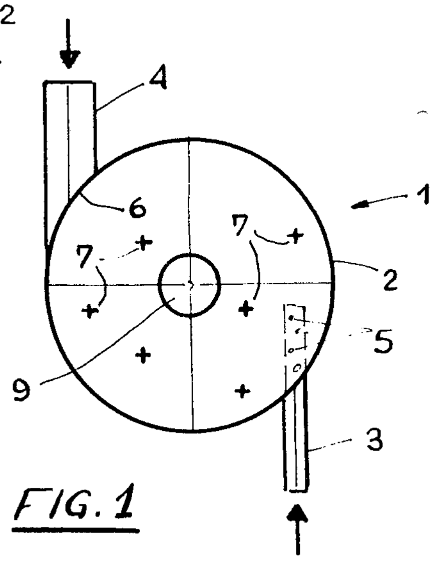
FIG. 1

METHOD FOR HARDENING A COMPOSITION PARTICULARLY INTENDED FOR MAKING FOUNDRY CORES AND MOULDS

The present invention relates to a process of hardening of a composition particularly intended for making foundry cores and moulds as well as for the making of refractory products, abrasive products and construction materials. It also deals with an apparatus which, in mixing two gases, allows the carrying out of the said hardening process.

The invention is concerned more particularly with the category of rapid, almost instantaneously-hardening moulding materials, which includes at least one granular charge and at least one acid-hardenable resin to cohere the granules of the charge and which hardens by $SO_2$ gasification.

According to the fundamentally original technique described in U.S. Pat. No. 3,879,339, the hardening of the composition of the said type is characterized in that it consists in gasifying the composition by sulfurous anhydride and introducing to the composition, before gasification or simultaneously with it, an oxidizing agent for the sulfurous anhydride.

The reaction obtained by this technique is that of the formation of sulfuric acid in situ in the composition, this sulfuric acid carrying out therefore the role of almost immediate hardening agent for the resin.

The introduction of the oxidizing agent for the sulphurous anhydride is envisaged in three variations all of which lead at the precise instant desired by the user to the formation in situ of sulfuric acid: (a) the oxidizing agent is a liquid or a solid which in a preliminary step is intimately mixed with the charge and the resin; the time of the reaction is that of the introduction of the sulfurous anhydride which in the presence of traces of water oxidizes and gives sulfuric acid according to the classic reaction $SO_2+H_2O+O \rightarrow H_2SO_4$ The oxidizing agent is a gas which is introduced into the midst of the composition of the charge and of the resin at the same time as the sulfurous anhydride; the time of the reaction is therefore that of the simultaneous introduction of the said two gases, the sulfurous anhydride oxidizing according to the reaction described above in order to give sulfuric acid (c) The oxidizing agent forms by combination with the sulfurous anhydride a chemical composition which is easily dissociable such as sulfuryl chloride; the reaction instant is that of the introduction of this gaseous chemical composition into the midst of the composition in which, after dissociation there is formation of sulfuric acid by oxidation of the sulfurous anhydride.

A first advantage of the said techniques is that the moulding material compositions have an unlimited life for the whole of the period before gasification with the sulfurous anhydride either alone or combined chemically with its oxidizing agent. The user is therefore in perfect command of the time when he desires to harden the composition, this time corresponding to the introduction of the sulfurous anhydride which in practice coincides with the formation of the sulfuric acid into the midst of the composition.

The three variants of the said technique allow hardening by the sulfuric acid henceforth to be accessible at an industrial plane thanks to its formation in situ immediately and at the time desired by the user, while according to the prior art—consisting of mixing the sulfuric acid with the hardening composition—there could be no question of exploitation on an industrial plane because the sulfuric acid which is a much too violent hardener destroys the composition uless it is strongly diluted, which in turn removes any possibility of a rapid hardening.

After the discovery of the technique of gasification by a sulfurous anhydride and its simultaneous oxidation in the midst of the composition to be hardened, a profound study of the kinematics of the said gasification showed that according to the charge (silicon, refractory material, metalliferous ore, glass, abrasive, for example), the permeability of the moulded mass with its charges varied considerably and had a very important influence on the conditions of gasification and on the rapidity of the latter.

Besides it is known that a second very important factor has a significant effect on the gasification time: this factor is that of the form of the mould or core receiving the charge to be cohered. Since moulds have to have a good seal in their joining plane it has been observed that diffusion of sulfurous anhydride is in fact counteracted in the areas where pockets of included air, which are difficult to eliminate, are formed.

We should note here that this difficulty of uniform diffusion of the gasification agent used for hardening is found also in all other techniques of gasification amongst which one can note, for example, gasification by carbonic acid or an amine, the diffusion of the gas blown in being necessarily hindered each time that, while penetrating the granular mass to be hardened, the gas encounters a pocket of air.

In order to eliminate this disadvantage various processes of hardening by gasification generally use the classical technique which consists of making holes in the mould and placing filters in these holes, which permit the escape of the included air. These filters may be of brass sieve formed by very closely juxtaposed strips, or of wirework (although the cleaning of the latter is more difficult) of which the gaps between the strips or the meshes of the grids are such that the air can escape but the granules of the charge cannot pass.

The filters are generally put in place at the bottom of blind holes as well as in all those areas where after filling of the mould or core it is believed that the compaction of the charge is not uniform but in spite of everything the placing of these filters is often done empirically.

The filters allow the escape of the pockets of air formed between the granules of the charge at the moment of filling of a mould or a core but unfortunately they each cause at the same time an air draught through which the gasification agent used for hardening ($SO_2$, $CO_2$, amine) escapes. In addition, the more filters there are in the mould or the core the more there are formed preferential paths for the passage of gas, which is therefore not shared uniformly through the mould or the core as was desired when placing the filters, and the more it is necessary to blow in a large quantity of gaseous hardening agent to reach all the parts of the moulded mass and particularly to reach embossments which are always the parts of the mass which are the most difficult to gasify correctly.

Having regard to these observations the applicant has sought to perfect the gasification process in such a way that he could use the smallest quantity of sulfurous anhydride in the smallest amount of time, with the object:

of increasing speed and therefore productivity of increasing returns by economising on sulfurous anhydride of improving conditions of work by maintaining the maximum of sulfurous anhydride inside the mass to be hardened instead of spreading it outside the mould or the core through the filters and therefore wasting it.

After many experiments directed to discovering the optimum pressure of gasification it became very quickly apparent that the normal pressures for gasification, lying in the low pressure range between 0.5 and 1 bar, would need very long diffusion times, and therefore that these diffusion times would shorten in step with an increase in gasification pressure.

Likewise systematic research with the aim of eliminating the preferential paths through which the gas circulates at the time of gasification of the composition to be hardened allows it to be said that according as the gasification pressure increases, filters in practice become ineffective with sulfurous anhydride bearing in mind the very great diffusability of the latter.

In fact it is necessary to know that the diffusibility of sulfurous anhydride is five times greater than that of carbonic gas and thirty-two times greater than that of air or that of oxygen for example. In other words if the gasification pressure is increased it is a fact that the filters become ineffective with sulfurous anhydride (save for rare exceptions imposed by the complex form of the mould or the core) and that on the contrary they are always indispensible in other processes for hardening by gasification such as the carbonic gas process or the Ashland process in which amine as the hardening agent is carried by carbonic gas.

Reducing to one the number of filters placed in a core-box intended for making 5,300 grams and cores of a height of 35 centimeters and gasified from above at a single point, the applicant has made several trials, each at a different gasification pressure. The record of the respective diffusion times gave the following values

| Gasification Pressure | Diffusion Time |
|---|---|
| 0.5 bar | 42 seconds of gasification |
| 1 bar | 12 seconds of gasification |
| 2 bar | 4 seconds of gasification |
| 3 bar | 2.5 seconds of gasification |
| 4 bar | 1.5 seconds of gasification |
| 5.5 bar | 0.7 seconds of gasification |

The very clear reduction in diffusion time as the pressure of sulfurous anhydride exceeds one bar has shown that even in the absence of filters the first stated objective that is to say increase of speed was being reached.

Nevertheless it was noted that the smell of the cores after gasification was very strong, the quantity of sulfurous anhydride necessary for reaching all the parts of the box requiring the use of an excess of this gas which, then lacking the capacity of reacting with the peroxide intimately mixed in the composition before gasification in order transform the sulfurous anhydride into sulfuric acid by oxidation, was dispersing into the atmosphere for quite a long time.

The strong smell of the cores after gasification on the one hand and on the other hand a certain lengthening of production time due to the necessity of purging the box for removing any remaining sulfurous anhydride showed that it was apparently desirable to research further back in order to eliminate the pockets of included air and remove them with the minimum of sulfurous anhydride.

These researches allowed a process for the hardening of a composition to be found which attains the three stated objects and which in addition eliminates the problem of smells after gasification and improves its returns thanks to saving in oxidising agent for the sulfurous anhydride which doubles the saving in gas.

The present invention has primarily for its object a process for the hardening of a composition intended particularly for the fabrication of foundry cores and moulds the said composition including at least one granular charge and at least one acid hardened resin to cohere the granules of the charge, said process comprising the known steps of gasifying the composition by sulfurous anhydride and of the introduction into the composition before or at the same time as the said gasification of an oxidising agent for the sulfurous anhydride characterised in that the sulfurous anhydride is blown in in dilution in another gas of lower diffusibility. Because of the difference existing between the diffusion values of the gases there is produced after their mixture a separation of the said gases and because the sulfurous anhydride has a greater diffusibility it is the sulfurous anhydride which will be driven out by the other gas, and which will therefore arrive first in the composition to be hardened while the gas of lower diffusibility will play the role of driver.

It can be seen immediately that it is advantageous to vary the pressure of the sulfurous annydride because in fact if one mixes this gas at low pressure with another driving gas with lower diffusibility provided at high pressure, the result of the two will be high pressure gas. After this it is possible to introduce sulfurous anhydride to the inside of a mould or a core at high pressure (whence a reduction in gasification time needed) but in a lower quantity than previously (whence an elimination of excess of sulfurous anhydride and the disappearance of strong smells after gasification).

In a first variant for carrying this out the gas of lower diffusibility in which the sulfurous anhydride is diluted such as air or carbonic gas is inert relative to the sulfurous anhydride. In this case the oxidizing agent for the sulfurous anhydride will be a solid or a liquid mixed intimately with the composition before gasification.

In a second variant for carrying out the process the gas of lower diffusibility in which the sulfurous anhydride is diluted such as oxygen, nitrous oxide or ozonated air is the oxidizing agent for the sulfurous anhydride. The oxidizing agent can equally be found in mixture with a gaseous vehicle such as air or carbonic gas which is in itself inert relative to the sulfurous anhydride.

The sulfurous anhydride being a gas which is readily liquefiable at 20° C. under a pressure of three bars it is in this liquid form that it is used industrially and for this purpose it is kept in glass syphons or in containers. Starting from that given technique two variants of the carrying out of gaseous mixing have been conceived.

In its first variant the gaseous mixture is effected by vapourization of the sulfurous anhydride within a current of the gas of lower diffusibility. In this case there is no need to carry out an actual change of the physical state of the sulfurous anhydride which keeps its liquid form in which it was stocked until mixture with the second dilution gas.

In its second variation the gaseous mixture is effected by putting the gaseous sulfurous anhydride in contact with the gas of lower diffusibility. The difficulty with this solution is that there is a need to turn the liquid sulfurous anhydride into gaseous sulfurous anhydride upstream of the place of contacting the dilution gas of diffusibility which is lower than that of sulfurous anhydride. This variant therefore will more particularly be reserved for installations having a central gasification station and a plurality of hardening stations.

According to a preferred application the sulfurous anhydride is diluted within a current of gas of lower diffusibility in the ratio of one part of sulfurous anhydride for two to twenty parts of the other gas and preferably in the ratio of the order of one to ten parts. Thanks to this form of application the quantity of sulfurous anhydride is reduced to a very considerable degree and from this it is established that the smell of the cores is very slight when it is checked immediately after gasification and is nil after two minutes delay.

In another particularly advantageous variation of carrying out the process the gas of lower diffusibility is heated before mixing it with the sulfurous anhydride. According to this technique it is possible for example to effect the mixture to be introduced into the composition to be hardened by contacting liquid or gaseous sulfurous anhydride with a pre-heated inert gas such as air or carbonic gas.

In a more sophisticated variant of carrying out the process the mixture of gas of lower diffusibility and sulfurous anhydride is heated in order to aid the dilution of the sulfurous anhydride. In this case the liquid sulfurous anhydride and the driving gas are introduced in a heater allowing immediate vapourisation of the sulfurous anhydride on the warm surfaces and its increase in pressure to a value sufficient that it will mix with the driving gas at a temperature lower than the value of 157° C. which is the critical temperature of sulfurous anhydride.

In another preferred variant the gaseous mixture of sulfurous anhydride and the dilution gas is introduced into the composition to be hardened at a pressure between 1.5 and 5.5 bars and preferably of the order of 4 to 5 bars.

The present invention has also for its object an apparatus for mixing at least two gases, particularly for the dilution of sulfurous anhydride and more precisely for vapourisation of liquid sulfurous anhydride in a current of gas of lower diffusibility, the said apparatus allowing the carrying out of the process of which the principal characteristics have been described above, said apparatus being characterised in that there is a vessel equipped with a heating body, the said vessel being provided, upstream of the heating body, with an inlet for sulfurous anhydride and an inlet for dilution gas and, downstream of the heating body, with an outlet for the gaseous mixture. This construction dispenses with the need for the heat generator which would need to be interposed, before the contact with the driving gas, if sulfurous anhydride at high pressure were to be used.

In a first variant of the construction the apparatus is filled with heat exchange bodies of a conducting material of which at least some are placed in contact with the heating body to ensure a perfect heat dispersion. These heat exchange bodies have a triple effect: in the first place they permit a better dispersion of the heat of the heating body into the whole of the mixer volume in the second place they allow the intensification of the mixing of the two gases and by instantaneous dilution of the sulfurous anhydride, they avoid all over-heating of the latter and in the third place they constitute heat stores which will ensure there will still be enough heat inside the mixer during the following operation even if the heating body has been turned off by accident or design.

Advantageously the apparatus includes at least one temperature control device allowing the control of the temperature of the heating body and/or of the exchange bodies and/or of the mixture of gas formed; the apparatus is in the form of a low-volume cylinder with its axis vertical, equipped at its upper part with two inlets respectively reserved for the two products to be mixed and at its lower part with an outlet for the gaseous mixture. The construction of an apparatus of small dimensions has two clear advantages. Firstly inertia is avoided and secondly the space occupied is minimised.

In a further variant of embodiment the apparatus is equipped with a perforate bottom for the retention of the exchange bodies, the volume occupied by the latter leaving free the entry apertures of the sulfurous anhydride and of the dilution gas as well as the exit aperture of the gaseous mixture.

For a better understanding of the object of the present invention there will be described hereafter by way of a purely illustrative and non-limitative example one particular form of embodiment with reference to the accompanying drawing on which:

FIG. 1 is a view from above of an apparatus for the mixture of two gases according to the invention, FIG. 2 is an outline view on the arrow II of the apparatus of FIG. 1, an apparatus of which the lateral wall is assumed to be transparent for a better understanding of the drawing.

Fig. 3 illustrates a variation in which the two gases are premixed in the apparatus using a venturi.

Trials carried out with the same 5,300 gram core box as that previously used when establishing diffusion time as a function of the various values of pressure in gasification by pure sulfurous anhydride, have been conducted with mixtures of sulfurous anhydride and carbonic gas and with mixtures of sulfurous anhydride and compressed air.

For mixtures made up of one part of sulfurous anhydride, for ten parts of dilution gas the gasification pressures were varied and the following diffusion times were noted.

| Gasification Pressure | Mixture Air + $SO_2$ Diffusion Time |
|---|---|
| 0.5 bar | 14 seconds of gasification |
| 1 bar | 4 seconds of gasification |
| 2 bar | 0.9 seconds of gasification |
| 3 bar | 0.5 seconds of gasification |
| 4 bar | 0.4 seconds of gasification |
| 5.5 bar | 0.3 seconds of gasification |

| Gasification Pressure | Mixture $SO_2$ + $CO_2$ Diffusion Time |
|---|---|
| 0.5 bar | 24 seconds of gasification |
| 1 bar | 7 seconds of gasification |
| 2 bar | 1.5 seconds of gasification |
| 3 bar | 0.9 seconds of gasification |

-continued

| Gasification Pressure | Mixture $SO_2 + CO_2$ Diffusion Time |
|---|---|
| 4 bar | 0.7 seconds of gasification |
| 5.5 bar | 0.5 seconds of gasification |

It can be said that gasification times are substantially shorter for the mixture made up of one part of $SO_2$ for ten parts of compressed air than for the mixture made up of $SO_2$ and $CO_2$ in the same ratio of 1 to 10 parts. It is known moreover that the diffusibility value of carbonic gas is five times less than that of sulfurous anhydride and that the diffusibility value of air is 32 times less than that of sulfurous anhydride.

Thence it is highly probable that the reaction mechanism happens in the following way.

Remember that a mixture of two gases having different diffusibilities sees the two gases separate in step with the displacement of the mixture, the gas of high diffusibility circulating ahead and the gas of lower diffusibility coming second in order, to act as driver for the first gas.

It can easily be seen that the closer the diffusibility values are and the more intimate the mixture; that on the other hand the more the diffusibility values differ and the more the separation of the two gases is facilitated. The concentration of gas of the greater diffusibility in the more rapidly moving fraction of the mixture is therefore greater as a function of the poorness of the diffusibility of the other gas. This characteristic is verified in the case of a mixture of $SO_2$ and compressed air whilst it is clearly less apparent in the case of the mixture of $SO_2$ and $CO_2$.

In other words in the case of the mixture of $SO_2$ and air the more rapidly moving fraction of the gaseous mixture which penetrates the composition to be hardened is practically pure sulfurous anhydride, whence the necessary gasification time is slightly less than that needed for a mixture of $SO_2$ and $CO_2$ of the same volume proportions, of which the most rapidly moving fraction contains a noticeable percentage of carbonic gas which will be without effect on the formation reaction of sulfuric acid within the composition.

In order to carry out the invention it is therefore advantageous to use as the gas which drives the sulfurous anhydride a second gas which has the worst possible diffusibility. For this purpose air is of more interest than carbonic gas.

In spite of everything the use of carbonic gas presents a significant advantage in another area over that of compressed air, in the sense that the $SO_2+CO_2$ mixture is less endothermic than the $SO_2+$ air mixture and that in consequence the making of the gaseous mixture of $SO_2$ and $CO_2$ is done with less heating than is necessary to mix sulfurous anhydride and air.

Other inert gases can be used to drive the sulfurous anhydride such as compressed nitrogen for example.

It is equally possible to use as a driver gas a gas which is the oxidizing agent for the sulfurous anhydride or even contains this oxidizing agent. In particular it is easy to use for this purpose nitrous oxide of which the diffusibility is 4.5 times less than that of sulfurous anhydride, or, better still, oxygen or ozonated air of which the diffusibility value is in each case the same as that of air.

The last said oxidizing gas is obtained by connecting an ozone generator onto a compressed air duct. In comparison with oxygen ozonated air thus made available will have the advantage of being much more reactive due to the presence of ozone.

Referring again to the tables giving values of gasification times as a function of pressure used one finds confirmation that a very small time is needed as soon as the gas pressure is raised. It is again possible to give an explanation of this phenomenon: during gasification at high pressure with the mixture of $SO_2+CO_2$ or the mixture of $SO_2+$ air the small quantity of sulfurous anhydride is the first to reach the composition to be hardened and, driven by the pressure of carbonic gas or of air it more readily expels the included pockets of air.

It is clear in fact that if the pressure of the gaseous mixture introduced into the composition is low the counterpressure in the pockets is greater than the pressure of sulfurous anhydride and there will be no displacement of these pockets. On the other hand if the pressure of the sulfurous anhydride is greater than that of the air contained in the pockets the sulfurous anhydride as a result of its high diffusibility has a tendency to displace the pockets of air (in the way, in liquids, water displaces oil) as far as infrequent filters left, as a safety measure, to allow the exit of gasification fluid.

The speed with which the sulfurous anhydride spreads between the granules of the charge to be hardened ensures that systematically and uniformly the pockets of air are expelled towards the exit by the sulfurous anhydride without it being necessary to place another filter, of which the fault would be to create preferred gasification paths.

In other words, contrary to the previous low pressure techniques which by using a plurality of filters carried out a sort of washing through the permeability of the charge to be hardened from one inlet placed on one side of the mould as far as multiple exits placed on the other side of this mould, the process according to the present invention recommends the working at high pressure for then the dispersion of sulfurous acid will be favoured even in zones where, because of pockets of included air there are counterpressures.

These few filters providing the infrequent outlet apertures from the mould or the core will ensure the circulation of sulfurous anhydride across the whole mass to be hardened and therefore will guarantee a gasification at all points of the mass.

In all the description which has gone before it has been said that the characteristic of the invention consisted in associating one of the principal agents of the hardening reaction namely sulfurous anhydride with a dilution gas of which the essential property is having a less good diffusibility, in such a way as to act as a driving element to send the sulfurous anhydride under pressure into the places where pockets of included gas are to be found. The association of the two gases has its essential originality in that the characteristic of high diffusibility of the sulfurous anhydride is exploited for particular purposes: $SO_2$ made available either at low or at high pressure and diluted in another gas, itself made available preferably at high pressure is concentrated in the most rapidly moving part of the mixture introduced into the composition to be hardened and is driven simultaneously both onto the oxidizing agent and onto the pockets of included air, which favours in the first place the oxidation reaction into sulfuric acid and in the second place the drawing of the pockets of air towards the outlet.

Let us now differentiate fundamentally this technique from the Ashland process according to which the reactive agent namely an amine of which the diffusibility is very poor is carried by a gas, in general carbonic gas, which diffuses better than the amine and which permits the formation of an aerosol.

In this Ashland technique the carbonic gas has a better diffusibility than the agent of the hardening reaction and it therefore plays exclusively the role of vehicle to the amine which is fundamentally opposite to the driving role which is filled by the dilution gas utilized in the present invention.

Various processes can be conceived for carrying out the mixing of the sulfurous anhydride and the dilution gas.

It is possible for example to put the dilution gas and sulfurous anhydride into contact in the gaseous form the condition to be observed in this case being the two gases shall be substantially at the same pressure to avoid any counter pressure in the exit from the distribution ducting of the gas which is made available at the lowest possible pressure which of course would harm the formation of the mixture.

Whatever is used, the use of the gaseous sulfurous anhydride at high pressure demands a substantial reheating of the containers since at the moment of the expansion of the gas there is a very strong endotherm; now this reheating is dangerous and insofar as possible this operation to be avoided.

Since the sulfurous anhydride is used industrially in the liquid state it is clear that there is every advantage in using it in this form up to the moment of mixture with the dilution gas since then there one avoids apparatus for the vaporisation of the liquid anhydride into gaseous anhydride as well as a heat generator.

Referring to the drawings there is shown at 1 in its entirety an apparatus for allowing the vaporisation of liquid sulfurous anhydride into a current of gas of lesser diffusability. This apparatus is shown in the form of a cylinder 2 with a vertical axis, of low volume, equipped at its upper part with two tubes respectively 3 and 4 which cross the lateral wall of the cylinder and open into the interior of the cylinder by apertures 5 and 6 respectively.

The tube 3 is joined to the container of liquid sulfurous anhydride. It is of smaller diameter than the tube 4 joined to the dilution gas such as air, carbonic gas, oxygen, ozonated air, or nitrous oxide or any other oxidising gas.

Advantageously the tube 3 presents moreover multiple apertures 5 in its portion inside the cylinder 2 so as to favour flow of the sulfurous anhydride.

Several heating bodies are placed inside the cylinder 2 for example electrical resistances 7 controlled by a thermostat.

Knowing that the sulfurous anhydride has a critical temperature at 157° C. it is rudimentary to avoid all local overheating which would risk causing decomposition of this gas which would bring in its train poor reliability of the process.

In order to offset this possible fault it is wise to fill the cylinder 2 with exchange bodies such as Raschig rings, balls 8, saddles, for example, preferably in a conductive material such as steel, copper, stainless steel or monel metal which is an alloy of copper and nickel.

The many advantages for these exchange bodies of which some at least are placed in contact with electrical resistors 7 in such a way as to ensure a perfect heat dispersion, have already been explained.

In addition, it is clear that the interaction of a plurality of balls 8 inside the cylinder 2 forms a succession of obstacles which ensure that the sulfurous anhydride which is vaporised on contact with the hot surfaces 7 and the dilution gas have to pass through a particularly devious path from the inlet apertures 5 and 6 to the common outlet aperture 9. Such an eventful path favours mixture of the two gases and makes their temperature uniform because in practice all the solid parts inside the cylinder namely the balls 8 are themselves at the same temperature.

The apparatus 1 is completed by a grating base or a perforated steel sheet 10 allowing the retention of the exchange bodies 8 which extend the whole height of the cylinder up to the line indicated by a dashed line 11 positioned immediately below the inlet apertures 5 and 6. There is therefore no risk that a ball 8 would block up the ducting 3.

A thermostat 12 is also provided for control of temperature of the exchange bodies 8 and also thermostat 13 for control of the temperature of the gaseous mixture formed. The inlet ductings 3 for $SO_2$ and 4 for the dilution gas are preferably disposed tangentially to the cylinder 2 so that the fluids are expelled in a spiral and so that turbulence will be produced, which will improve the mixing.

The apparatus shown in FIGS. 1 and 2 has allowed the direct incorporation of $SO_2$ liquid into a current of air thanks to the resistances 7 incorporated and to the exchange bodies 8, and this without icing-up and without specific heating upstream of the apparatus 1. In this first construction we observe that the fluids to be mixed have of course to be distributed at roughly equal pressures since the streams emerging from the inlet apertures 5 and 6 are more or less opposed.

As a variant of construction as shown in Fig. 3, and to allow, this time, a mixture of liquid $SO_2$ at low pressure (1 bar for example) and a current of dilution gas at high pressure (4 bar for example) the resulting mixture is necessarily a gas of which the pressure is substantially superior to 4 bar, there has been used a venturi tube 14 replacing the ductings 3 and 4 in the upper part of the cylinder 2.

In this venturi, $SO_2$ at low pressure is introduced to the center 15 of the installation while at the edge 16 the dilution gas is introduced at high pressure. $SO_2$ is entrained by the diluting stream without there being any counterpressure in the piping 15,3. Indeed on the contrary it produces an aspiration of $SO_2$ by the dilution gas since, because the two fluids arrive in the same direction, the current 17 of fluid having the highest pressure has a tendency to draw out the fluid 18 which is brought in at low pressure.

The advantage of this construction variant is that it avoids any possible reheating of the containers of the liquid sulfurous anhydride containers in winter, that is to say during a period when it is not certain that distribution of sulfurous anhydride will be possible at high pressures of the order of 4 bar.

Experiments have verified that the simultaneous arrival of compressed air in larger volume than the sulfurous anhydride allows an intimate and instantaneous mixture of the two gases at the moment of vaporisation of the sulfurous anhydride on the heating bodies 7.

It has been verified that because of the easy control of the pressure of the compressed air it is henceforth possible to gasify the composition to be hardened under rigorous and completely reproduceable conditions, which allows completely reliable obtaining of minimum gasification times with a complete diffusion of sulfurous anhydride through the whole mass which is to be hardened, almost without excess of that anhydride.

Moreover it has been shown there is a very considerable improvement of the yield of the oxidation reaction between the sulfurous anhydride and the agent designated for transforming it within the composition into sulfuric acid. This improvement is probably due to the fact that the apparatus 1 delivers a warmed gaseous mixture which causes the reaction of the sulfurous anhydride with the oxidizing agent to be favoured in relation to the same reaction carried out with anhydride at ambient temperature.

Thus there is a first economy in oxidizing agent.

Furthermore the fact that gas is used under high pressure causes shock waves through the mass to be hardened, which improve the yield of the reaction between the sulfurous anhydride and its oxidizing agent. In particular the anhydride would have a greater reactivity relative to the oxidation agent which covers each granule of the mass to be hardened.

On this basis, the applicant has advantageously been led to adopt a pulsatory system to cause increase and decrease in pressure inside the mould or core. Thanks to these variations the frequency of the shock waves is increased on the one hand, and on the other hand, as a counterpart, there are avoided within the mould or the core any excess pressures which are sometimes harmful to the equipment.

In fact as soon as the arrival pressure of the gaseous mixture obtained in the apparatus 1 is stopped there is an escape through the infrequent filters provided in the mould or the core and therefore the pressure falls again quickly. Moreover the cover of the mould or core to be gasified is held by a pneumatic jack of which the air gradually tends to let off pressure when an excess pressure is produced, whence a loss of tightness at the level of the cover of the mould or the core. It is known of course that this releasing action of the fluid of the jack occurs fairly slowly because air is compressible only with a certain inertia. Consequently putting the interior of the mold or core under modulated pressure, by imposing pulsations, allows a higher pressure to be obtained in the mass to be hardened at a frequency such that the jack does not register them and therefore does not release its pressure on the cover of the box.

I claim:

1. Process for the hardening of a composition intended particularly for the production of foundry cores or moulds as well as for the manufacture of refractory products, abrasive products or construction materials, the said composition including at least one granular charge and at least one acid hardenable resin to cohere the granules of the charge, the said process including the known steps of gasification of the composition by sulfurous anhydride and of the introduction into the composition before or at the same time as the said gasification of an oxidizing agent for the sulfurous anhydride characterised in that the sulfurous anhydride is blown in in dilution in another gas of lower diffusibility in the ratio of one part of sulfurous anhydride for two to twenty parts of the other gas, the temperature of the resultant gas mixture being below the critical temperature of sulfurous anhydride and the gas mixtures being introduced under superatmospheric pressure into the composition to be hardened.

2. Process according to claim 1 characterised in that the gas of lower diffusibility in which the sulfurous anhydride is diluted is inert relative to the sulfurous anhydride.

3. Process according to claim 1 characterised in that the gas of lower diffusibility in which the sulfurous anhydride is diluted is an oxidizing agent for sulfurous anhydride.

4. Process according to claim 1 characterised in that the gaseous mixture is formed by vapourisation of the sulfurous anhydride into the current of gas of lower diffusibility.

5. Process according to claim 1 characterised in that the gaseous mixture is formed by contacting gaseous sulfurous anhydride and the gas of lower diffusibility.

6. Process according to claim 1 characterised in that the sulfurous anhydride is diluted in the current of gas of lower diffusibility in the ratio of one part of sulfurous anhydride for ten parts of the other gas.

7. Process according to claim 1 characterised in that the gas of lower diffusibility is heated before it is mixed with sulfurous anhydride.

8. Process according to claim 1 characterised in that the mixture of gas of lower diffusibility and sulfurous anhydride is heated to favour the dilution of the latter.

9. Process according to claim 1 characterised in that the gaseous mixture of sulfurous anhydride and of dilution gas is introduced into the composition to be hardened at a pressure between 1.5 and 5.5 bar.

10. Process according to claim 1 characterised in that the mixture of sulfurous anhydride and dilution gas is blown in by pulsations into the interior of the mould or core.

11. Process according to claim 1 characterised in that the gas of lower diffusibility in which the sulfurous anhydride is diluted contains an oxidizing agent for the sulfurous anhydride.

12. Process according to claim 2 in which the gas of lower diffusibility is selected from the group consisting of air and carbon dioxide.

13. Process according to claim 3 or claim 11 characterised in that the gas of lower diffusibility is selected from the group consisting of oxygen, nitrous oxide and ozonated air.

* * * * *

UNITED STATES PATENT AND TRADEMARK OFFICE

CERTIFICATE OF CORRECTION

PATENT NO. : 4,269,758

DATED : May 26, 1981

INVENTOR(S) : GERARD Y. RICHARD

It is certified that error appears in the above-identified patent and that said Letters Patent are hereby corrected as shown below:

Column 1, line 40, before "The" insert --(b)--.

Column 3, line 38, change "grams and" to --gram sand--.

Signed and Sealed this

Twenty-fourth Day of November 1981

[SEAL]

*Attest:*

GERALD J. MOSSINGHOFF

*Attesting Officer* *Commissioner of Patents and Trademarks*